United States Patent
Futral et al.

(10) Patent No.: US 7,120,708 B2
(45) Date of Patent: Oct. 10, 2006

(54) READDRESSABLE VIRTUAL DMA CONTROL AND STATUS REGISTERS

(75) Inventors: William T. Futral, Portland, OR (US); Jie Ni, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 97 days.

(21) Appl. No.: 10/610,660

(22) Filed: Jun. 30, 2003

(65) Prior Publication Data

US 2004/0267979 A1 Dec. 30, 2004

(51) Int. Cl.
*G06F 13/28* (2006.01)
(52) U.S. Cl. ............................ 710/26; 710/22; 710/308
(58) Field of Classification Search .................. 710/22, 710/26, 33, 19, 52, 308; 709/212
See application file for complete search history.

(56) References Cited

U.S. PATENT DOCUMENTS

| | | | | |
|---|---|---|---|---|
| 5,828,901 A | * | 10/1998 | O'Toole et al. ............... | 710/22 |
| 5,828,903 A | * | 10/1998 | Sethuram et al. ............. | 710/53 |
| 6,023,738 A | | 2/2000 | Priem et al. .................. | 710/23 |
| 6,065,071 A | | 5/2000 | Priem et al. .................. | 710/22 |
| 6,163,820 A | * | 12/2000 | Garrett et al. ................ | 710/33 |
| 6,370,601 B1 | | 4/2002 | Baxter ......................... | 710/15 |
| 6,725,292 B1 | * | 4/2004 | Walker et al. ................ | 710/22 |
| 2005/0033874 A1 | | 2/2005 | Futral et al. .................. | 710/22 |

OTHER PUBLICATIONS

Futral, et al., "Method for Split DMA Processing," www.ip.com, Publication No. IPCOM000012023D, Apr. 2, 2003.
Futral, et al., "Method for DMA Descriptor Queuing," www.ip.com, Publication No. IPCOM000012024D, Apr. 2, 2003.
PCT Notification of Transmittal of the International Search Report and the Written Opinion of the International Searching Authority, or the Declaration, PCT/US2004/020197, Dec. 13, 2004.

* cited by examiner

*Primary Examiner*—Fritz Fleming
*Assistant Examiner*—Harold Kim
(74) *Attorney, Agent, or Firm*—Blakely, Sokoloff, Taylor & Zafman LLP

(57) ABSTRACT

Apparatus and method for carrying out a DMA transfer wherein an address is written into a DMA register of a DMA controller specifying a memory location within a memory device at which either the parameters for a transfer of a block of data are provided or the status of the transfer of a block of data is to be written by the DMA controller.

21 Claims, 10 Drawing Sheets

READDRESSABLE VIRTUAL DMA CONTROL AND STATUS REGISTERS

FIELD OF THE INVENTION

The present invention is related to defining virtual DMA registers in memory address space to control and monitor the status of DMA transfers.

BACKGROUND

Various computer system architectures have employed a number of approaches to attempt to efficiently transfer blocks of data across busses and between devices (including memory devices, I/O devices, etc.) within a computer system. One of the simplest approaches has been to allow the CPU (central processing unit) to read a block of data from one device and then write the block of data to another device. However, this task is often regarded as a task better suited to being delegated to other alternative mechanisms so that the CPU may be more fully devoted to carrying out more complex calculations and other computational tasks.

One widely used alternative mechanism is the addition of a DMA (direct memory access) controller to such a computer system to take over the moving of blocks of data between the system memory of the computer system and other devices. Typically, such DMA controllers are programmed to carry out a specific transfer of a block of data by the CPU writing the parameters of the transfer directly into registers within the DMA controller. Then, as the transfer of a block of data is carried out, the CPU is typically programmed to poll one or more of the registers within the DMA controller to query the status of the transfer.

However, use of such a DMA controller has drawbacks. Although the CPU is relieved of the burden of actually carrying out the transfer of a block of data, having the CPU poll registers within the DMA controller to query the status of the transfer is still often considered inefficient. Also, in many implementations of computer systems, write operations carried out by the CPU to program registers within the DMA controller and read operations carried out by the CPU to query status from a register within the DMA controller may take more time than is deemed desirable.

Another widely used alternative mechanism is the incorporation of bus mastering capabilities into various I/O devices within a computer system so that the devices, themselves, are able to autonomously carry out the transfer of blocks of data. Typically, such transfers are programmed to take place by the CPU writing the parameters of the transfer directly into registers within such a bus mastering device. Then as the transfer of a block of data is carried out, the CPU polls one or more of the registers within the bus mastering device to query the status of the transfer.

However, such a use of a bus mastering device has drawbacks. Although the CPU is relieved of the burden of actually carrying out the transfer of a block of data, write operations carried out by the CPU to program registers within the DMA controller and read operations carried out by the CPU to query status from registers within the DMA controller may take more time than is deemed desirable. Also, read operations carried out by a bus mastering device, especially to read a block of data from system memory, may also take more time than is deemed desirable.

BRIEF DESCRIPTION OF THE DRAWINGS

The objects, features, and advantages of the present invention will be apparent to one skilled in the art in view of the following detailed description in which.

DETAILED DESCRIPTION

In the following description, for purposes of explanation, numerous details are set forth in order to provide a thorough understanding of the present invention. However, it will be apparent to one skilled in the art that these specific details are not required in order to practice the present invention as hereinafter claimed.

The present invention as hereinafter claimed concerns incorporating support for maintaining virtual registers for a DMA controller in storage locations within other devices of a computer system or other similar electronic system. Although the following discussion centers on DMA controllers within computer systems, it will be understood by those skilled in the art that the present invention as hereinafter claimed may be practiced in support of electronic systems having DMA controllers or other similarly dedicated logic for the moving of blocks of data between devices.

Figure 1:
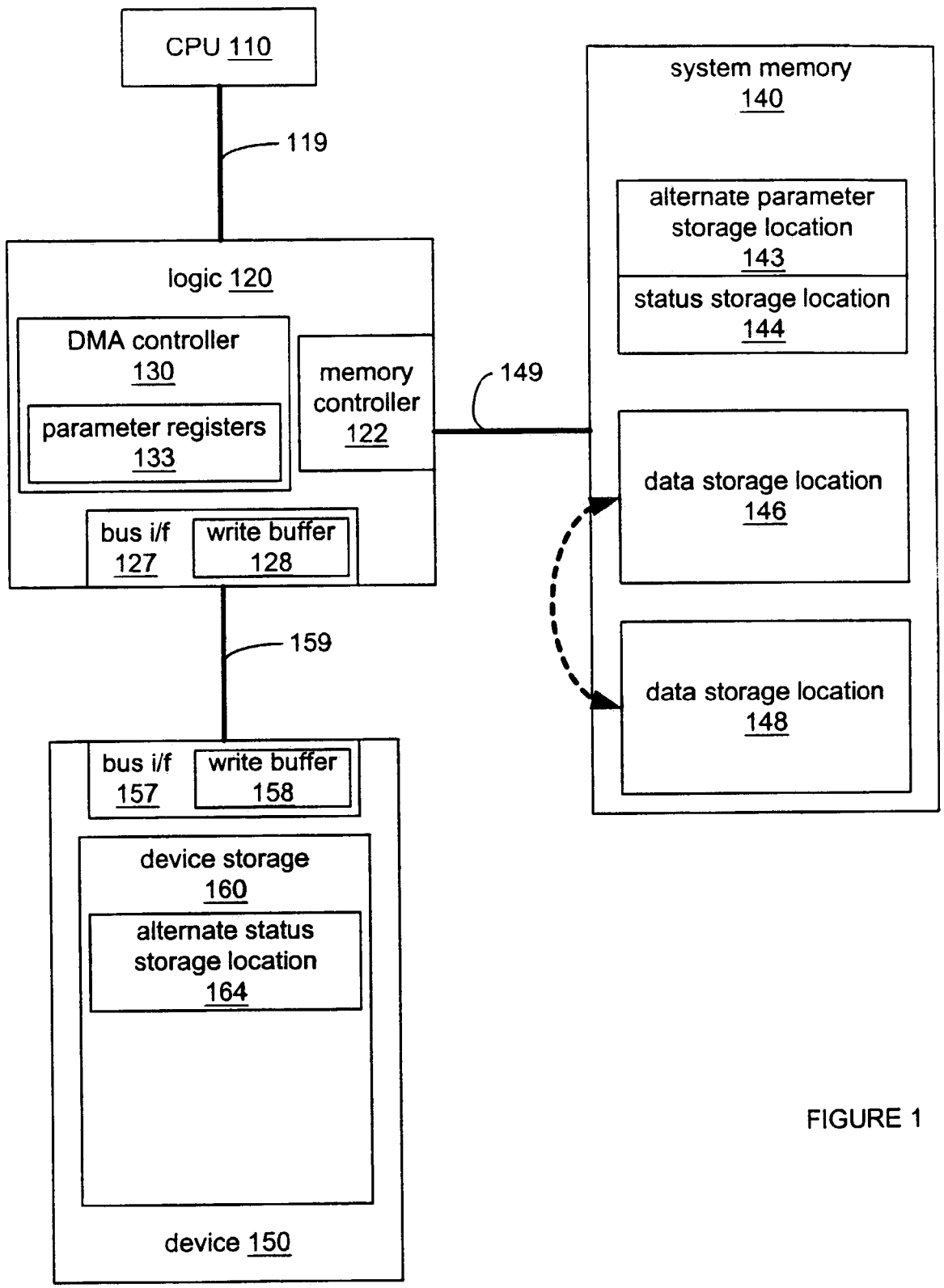
FIG. 1 is a block diagram of embodiments employing a computer system.

FIG. 1 is a block diagram of embodiments employing a computer system. Computer system 100 is, at least in part, made up of CPU (central processing unit) 110, bus 119, logic 120, bus 149, system memory 140, bus 159 and device 150. CPU 110, bus 119, logic 120, bus 149 and system memory 140 make up a form of core of computer system 100 capable of executing machine readable instructions that may be stored within system memory 140 and/or within other devices of computer system 100. However, as those skilled in the art will readily recognize, this is but one example of many possible forms of core of computer system 100, and that computer system 100 may also be further made up of other busses and devices not shown.

In various embodiments, CPU 110 could be any of a variety of types of CPU including a CPU capable of executing at least a portion of the widely known and used "x86" instruction set originated by Intel Corporation, a corporation of Santa Clara, Calif. Also, in various possible embodiments, there could be more than one CPU along with additional buses and/or devices to provide support for more than one CPU (not shown). Logic 120 is coupled to CPU 110 via bus 119, and performs various functions in support of the execution of instructions by CPU 110, including controlling and providing CPU 110 with access to system memory 140 to which logic 120 is further coupled via bus 149. Logic 120 also provides access to other devices making up computer system 100, such as device 150 to which logic 120 is coupled via bus 159.

In being coupled to busses 119, 149 and 159, and providing CPU 110 with access to each of system memory 140 and device 150 to enable transactions by which addresses, commands and data are transferred, logic 120 serves as what is commonly referred to as a "bridge" between these busses. In serving as a bridge, logic 120 also provides computer system 100 with memory controller 122 to aid in carrying out transactions on bus 149, and bus interface 127 to aid in carrying out transactions on bus 159. To relieve CPU 110 of some of the burden of carrying out some transfers of blocks of data, logic 120 further provides DMA controller 130.

In various embodiments, system memory 140 could be any of a variety of types of random access memory (RAM) including fast page mode (FPM), extended data out (EDO), single data rate (SDR) or double data rate (DDR) forms of synchronous dynamic RAM (SDRAM), or RAM employing the RAMBUS™ interface or other interfaces. Memory controller 122 and bus 149 are configured to support the timing and/or protocol requirements of one or more types of memory and/or memory interfaces.

In various embodiments, bus 159 and/or other busses as may make up computer system 100 may be designed to conform to the characteristics and/or specifications of any of a variety of widely known forms of busses that have become "standardized" in the art of computer design, such as extended industry standard architecture (EISA), Micro Channel™ architecture (MCA), peripheral component interconnect (PCI), PCI-X, PCI Express, etc. Bus interfaces 127 and 157 are configured to support the timing and/or protocol requirements of bus 159.

In one embodiment, CPU 110 executes a series of instructions that causes CPU 110 to program DMA controller 130 to carry out a transfer of a block of data between data storage locations 146 and 148 within system memory 140. CPU 110 writes one or more of parameter registers 133 with values specifying various parameters of the transfer to take place including, but not limited to, the starting addresses of data storage locations 146 and 148, a value indicating the quantity of data to be transferred (i.e., the size of the block of data), a value indicating that the status of the transfer is to be provided at status storage location 144 allocated within system memory 140, and a value into one or more control bits to cause the transfer to take place. DMA controller 130 then executes the transfer. During execution of this transfer, CPU 110 is able to read status storage location 144 one or more times to determine whether or not DMA controller 130 has written a value into status storage location 144 that indicates that the transfer has been completed. Given that it is common practice in the design of computer systems, such as computer system 100, to create a very low latency path between CPUs and system memory, it is likely that CPU 110 will be able to repeatedly check for the status of the transfer by reading status storage location 144 within system memory 140 much more quickly than the prior art approach of reading from a register within DMA controller 130.

In another embodiment, CPU 110 executes a series of instructions that causes CPU 110 to program DMA controller 130 to carry out a transfer of a block of data between data storage locations 146 and 148 within system memory 140 by writing various parameters of the transfer to take place into alternate parameter storage location 143 allocated within system memory 140. Such parameters could include, but are not limited to, the starting addresses of data storage locations 146 and 148, a value indicating the quantity of data to be transferred, and a value indicating that the status of the transfer is to be provided at status storage location 144. CPU 110 is also caused to write one or more of parameter registers 133 with a value specifying the starting address of alternate parameter storage location 143, and a value into one or more control bits as a trigger to cause the transfer to take place. In response to this trigger, DMA controller 130 then executes the transfer. During execution of the transfer, CPU 110 is able to read status storage location 144 one or more times to determine whether or not DMA controller 130 has written a value into status storage location 144 that indicates that the transfer has been completed.

In one variation of this embodiment, status storage location 144 is either part of alternate parameter storage location 143 or is allocated at an address within system memory 140 that is at a predetermined offset from the base address of alternate parameter storage locations 143. In another variation of this embodiment, DMA controller 130 is separately programmed (either via parameter registers 133 or alternate parameter storage location 143) with an address for status storage location 144.

In still other variations of this embodiment, status of the transfer is written to alternate status storage location 164 within device storage 160 of device 150, and DMA controller 130 is programmed (either via parameter registers 133 or alternate parameter storage location 143) with the address for alternate status storage location 164. Alternate status storage location 164 is made up of one or more memory locations allocated within device storage 160, a memory buffer within device 150 that may be used for any of a number of possible purposes depending on the nature of device 150, as those skilled in the art will readily understand. An advantage of writing status of the transfer into alternate status storage location 164 within device storage 160 of device 150 is that device 150 may be awaiting such status as a condition to carrying out some other task, and undesirable delays may be avoided by not writing status into status storage location 144 within system memory 140 from which the status might have to be subsequently transferred to device 150. The advantage may be greater still if the subsequent transfer of status from status storage location 144 to alternate status storage location 164 would have required device 150 to employ bus mastering capabilities that device 150 may possess to read status storage location 144. As those skilled in the art will understand, carrying out a read operation across a bus, such as bus 159, can take longer to complete than a write operation, and can also momentarily lock up a bus. This is due to a read operation first requiring a request for data to be made across a bus to read a piece of data, such as the status of the transfer, and then a period of waiting next being required until the requested data can be provided. Depending on the design of bus 159, rules of coherency and ordering of read and write operations may require that bus 159 not be used or that at least device 150 not carry out at least a subset of other transfers across bus 159 until the status is received. Therefore, depending on the circumstances at the time that a read operation begins, both system memory 140 and device 150, as well as both buses 149 and 159, may become momentarily monopolized with answering and completing a read operation to read status from status storage location 144. In contrast, if status is written directly by DMA controller 130 to device 150, it is possible to take advantage of the less stringent requirements usually imposed on write operations for the sake of maintaining coherency and ordering such that the write operation can be allowed to posted in write buffer 128 of bus interface 127 and then later transferred across bus 159 to device 150 when possible with less likelihood of bus 159 becoming locked up.

Figure 2:
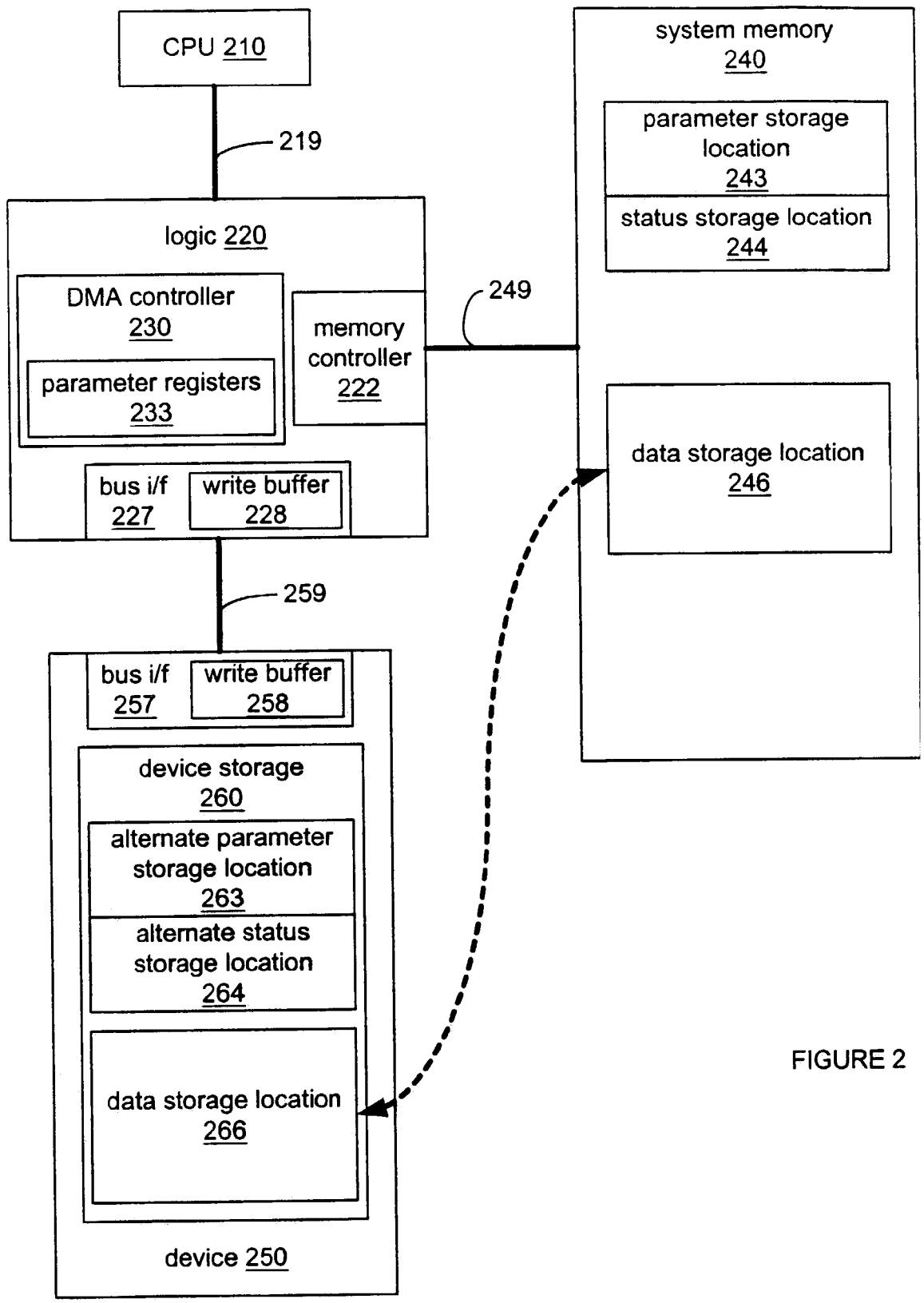
FIG. 2 is another block diagram of other embodiments employing a computer system.

FIG. 2 is another block diagram of embodiments employing a computer system. The numbered items in FIG. 2 are meant to generally correspond to the number items in FIG. 1, and in a manner not unlike computer system 100 of FIG. 1, computer system 200 is, at least in part, made up of CPU 210, bus 219, logic 220, bus 249, system memory 240, bus 259 and device 250. As was the case with computer system 100, those skilled in the art will readily recognize that this is but one example of many possible forms of core of computer system 200, and that computer system 200 may also be further made up of other busses and devices not shown. Logic 220 is coupled to CPU 210 via bus 219, and performs various functions in support of execution of instructions by CPU 210, including controlling and providing CPU 210 with access to system memory 240 to which logic 220 is further coupled via memory controller 222 within logic 220 and bus 249. Logic 220 also provides access to other devices making up computer system 200, such as device 250, to which logic 220 is coupled via bus interface 227 within logic 220 and bus 259.

In one embodiment, CPU 210 executes a series of instructions (perhaps stored within system memory 240) that causes CPU 210 to program DMA controller 230 to carry out a transfer of a block of data between data storage location 246 within system memory 240 and data storage location 266 within device 250. CPU 210 writes various parameters of the transfer to take place into memory locations within parameter storage location 243 allocated within system memory 240. Such parameters could include, but are not limited to, the starting addresses of data storage locations 246 and 266, a value indicating the quantity of data to be transferred, and a value indicating that the status of the transfer is to be provided at status storage location 244 allocated within system memory 240. CPU 210 is also caused to write one or more of parameter registers 233 within device 250 with a value specifying the starting address of parameter storage location 243, and a value into one or more control bits as a trigger to cause the transfer to take place. DMA controller 230 then executes the transfer in response to the trigger. During execution of the transfer, CPU 210 is able to read status storage location 244 one or more times to determine whether or not DMA controller 230 has written a value into status storage location 244 that indicates that the transfer has been completed.

In one variation of this embodiment, status storage location 244 is part of parameter storage location 243 or is allocated at an address within system memory 240 that is at a predetermined offset from the base address of parameter storage location 243. In another variation of this embodiment, DMA controller 230 is separately programmed (either within parameter registers 233 or parameter storage location 243) with an address for status storage location 244. In still another variation of this embodiment, status of the transfer is written to alternate status storage location 264 within device storage 260 of device 250, and DMA controller 230 is programmed with the address for alternate status storage location 264, thereby allowing device 250 to be more speedily provided with the status of the transfer, if desired.

In another embodiment, CPU 210 executes a series of instructions that causes CPU 210 to program DMA controller 230 to carry out a transfer of a block of data between data storage locations 246 and 266 by writing various parameters of the transfer to take place into alternate parameter storage location 263 allocated within device storage 260 of device 250. As before, such parameters could include, but are not limited to, the starting addresses of data storage locations 246 and 266, a value indicating the quantity of data to be transferred, and a value indicating that the status of the transfer is to be provided at alternate status storage location 264. CPU 210 is also caused to write one or more of parameter registers 233 with a value specifying the starting address of alternate parameter storage locations 263, and a value into one or more control bits as a trigger to cause the transfer to take place. DMA controller 230 then executes the transfer in response to the trigger. During this execution of the transfer, either device 250 or CPU 210 is able to read status storage location 264 one or more times to determine whether or not DMA controller 230 has written a value into status storage location 264 that indicates that the transfer has been completed.

Figure 3:
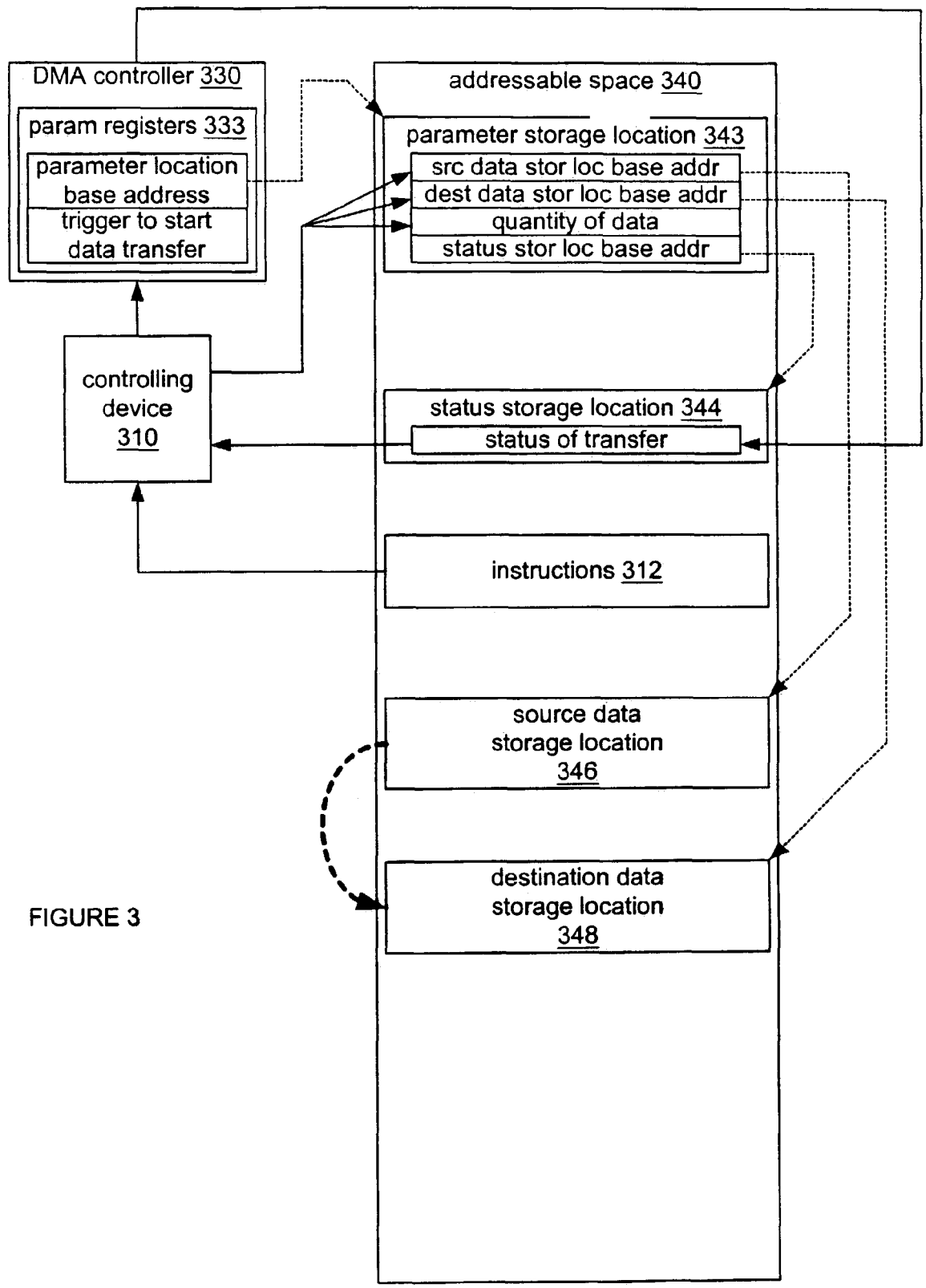
FIG. 3 is a block diagram of embodiments of interaction between devices engaged in transferring a block of data.

FIG. 3 is a block diagram of embodiments of interactions between devices engaging in transferring a block of data. Specifically, FIG. 3 depicts the interaction of controlling device 310, DMA controller 330 and one or more memory devices and/or devices providing storage in carrying out the transfer of a block of data from source data storage location 346 to destination data storage location 348. Controlling device 310 could be a CPU (either of a computer system or other electronic system), microcontroller, sequencer, etc., capable of executing instructions 312 to cause a transfer of a block of data to take place by causing controlling device 310 to program registers within DMA controller 330 to which controlling device 310 is coupled. Addressable space 340 is a map of address locations accessible to both controlling device 310 and DMA controller 330.

In some embodiments, addressable space 340 may be made up entirely of a single system memory device (not shown) to which both controlling device 310 and DMA controller 330 are coupled. Such embodiments could be largely analogous to embodiments of FIG. 1 with both source data storage location 346 and destination data storage location 348 being within a system memory device, such as system memory 140, in a manner not unlike data storage locations 146 and 148. In other embodiments, addressable space 340 may be made up of a combination of memory devices and/or buffers within other devices to which both controlling device 310 and DMA controller 330 are coupled. Such embodiments could be largely analogous to embodiments of FIG. 2 with source data storage location 346 and destination data storage location 348 being allocated within different devices, in a manner not unlike data storage location 246 being allocated within system memory 240 and data storage location 266 being allocated within device storage 260 of device 250. More precisely, for example, source data storage location 346 may be located within a system memory and destination data storage location 348 may be located within a buffer within another device.

Controlling device 310 is caused (as a result of executing instructions 312) to prepare for the execution of a transfer of a block of data from source data storage location 346 to destination data storage location 348 by writing the base addresses of both source data storage location 346 and destination data storage location 348, along with the quantity of data to be transferred and the address of status storage location 344 into parameter storage location 343. Controlling device 310 also writes the base address of parameter storage location 343 into parameter registers 333 within DMA controller 330 along with one or more bits to trigger DMA controller 330 to carry out the transfer of data.

In response to this trigger, DMA controller 330 accesses parameter storage location 343 at the base address programmed into parameter registers 333 to obtain the base addresses of both source data storage location 346 and destination data storage location 348, the quantity of data to be transferred and the base address of status storage location 344. DMA controller 330 carries out the transfer of a block of data from source data storage location 346 to destination data storage location 348, and writes status of the transfer to status storage location 344. Controlling device 310 reads the status of the transfer from status storage location 344 to determine whether or not DMA controller 330 has written a value into status storage location 344 indicating that the transfer of data has been completed.

Figure 4:
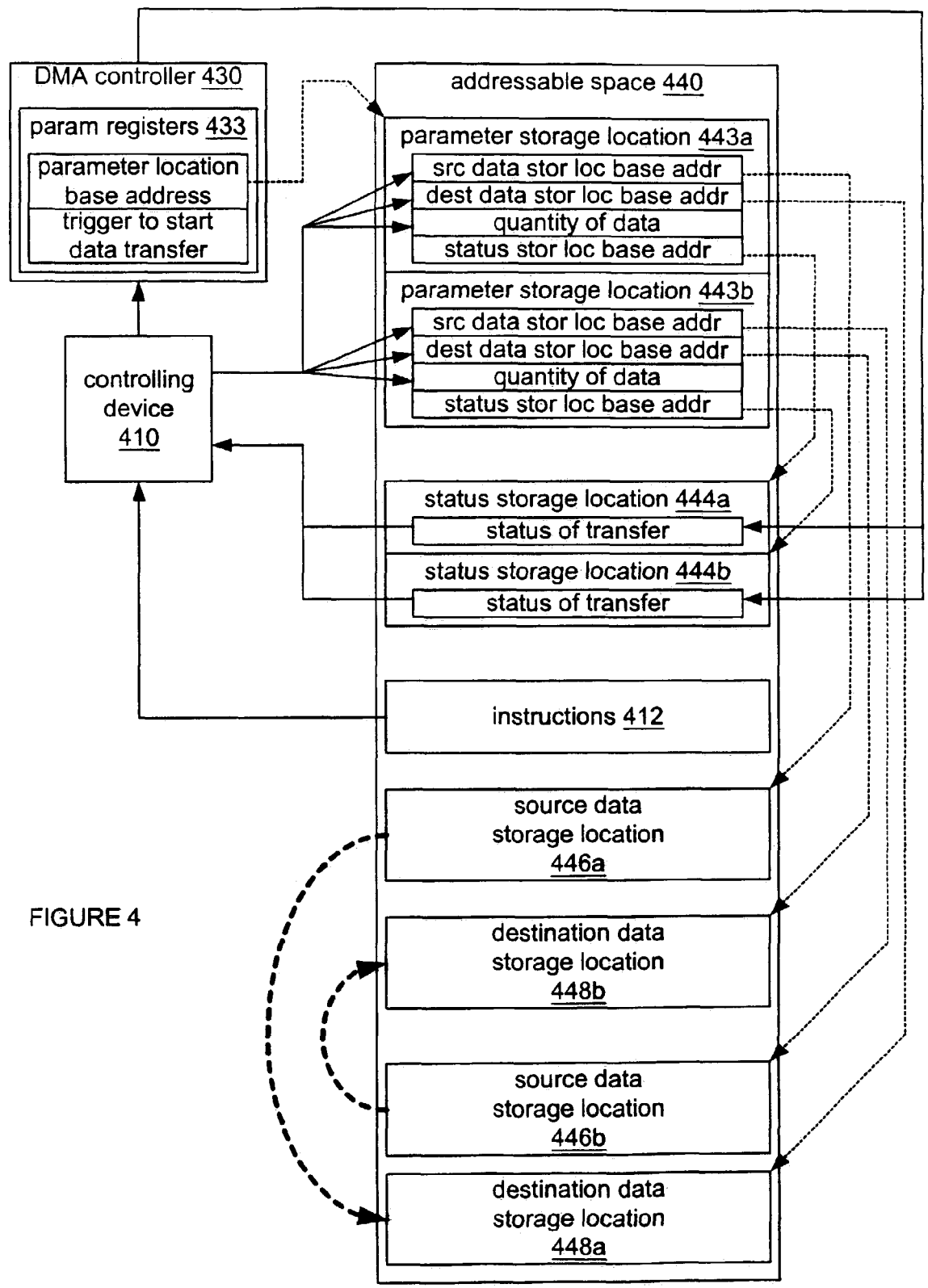
FIG. 4 is a block diagram of embodiments of interaction between devices engaged in transferring multiple blocks of data.

FIG. 4 is a block diagram of embodiments of interactions between devices engaging in transferring multiple blocks of data. Specifically, FIG. 4 depicts the interaction of controlling device 410, DMA controller 430 and one or more memory devices and/or devices providing storage in carrying out the transfer of a block of data from source data storage location 446a to destination data storage location 448a and then the transfer of another block of data from source data storage location 446b to destination data storage location 448b. The numbered items in FIG. 4 are meant to generally correspond to the number items in FIG. 3, and not unlike controlling device 310 of FIG. 3, controlling device 410 could be a CPU (of either a computer system or other electronic system), microcontroller, sequencer, etc., capable of executing instructions 412 to cause the transfer of blocks of data to take place by programming registers within DMA controller 430 to which controlling device 410 is coupled. Addressable space 440 is a map of address locations accessible to both controlling device 410 and DMA controller 430.

In some embodiments, addressable space 440 may be made up entirely of a single system memory device (not shown) to which both controlling device 410 and DMA controller 430 are coupled. In other embodiments, addressable space 440 may be made up of a combination of memory devices and/or buffers within other devices to which both controlling device 410 and DMA controller 430 are coupled. By way of example, both source data storage location 446a and destination data storage location 448b may be located within a system memory, and both source data storage location 446b and destination data storage location 448a may be located within a buffer within another device.

Controlling device 410 is caused (as a result of executing instructions 412) to prepare for the execution of multiple transfers of blocks of data by writing the base addresses of source data storage locations 446a and 446b and destination data storage locations 448a and 448b, along with corresponding quantities of data to be transferred, and corresponding addresses of status storage locations 444a and 444b into corresponding parameter storage locations 443a and 443b. Controlling device 410 also writes the base address of parameter storage location 443a into parameter registers 433 within DMA controller 430 along with one or more bits to trigger DMA controller 430 to begin transferring blocks of data.

In response to this trigger, DMA controller 430 accesses parameter storage location 443a at the base address programmed into parameter registers 433 to obtain the base addresses of both source data storage location 446a and destination data storage location 448a, the quantity of data to be transferred and the base address of status storage location 444a. DMA controller 430 carries out the transfer of a block of data from source data storage location 446a to destination data storage location 448a, and writes status of the transfer to status storage location 444a. DMA controller 430 then accesses parameter storage location 443b to obtain the base addresses of both source data storage location 446b and destination data storage location 448b, the quantity of data to be transferred and the base address of status storage location 444b. DMA controller 430 then carries out the transfer of a block of data from source data storage location 446b to destination data storage location 448b, and writes status of the transfer to status storage location 444b. Controlling device 410 reads the status of the transfers from status storage locations 444a and 444b to determine whether or not DMA controller 430 has written a value into status storage location 444a and 444b indicating that the transfers of data have been completed.

In one embodiment, the base address of parameter storage location 443a written into parameter registers 433 serves as the pointer to the base of a one or more parameter storage locations (such as parameter storage location 443a) that are positioned at predetermined intervals (the length of the intervals being either programmed or hardwired into DMA controller 430) in a chain such that DMA controller 430 requires only the base address of the first such parameter storage location in the chain, and DMA controller 430 is able to iterate through the chain until the last such parameter storage location with parameters for a transfer of a block of data is encountered. In such an embodiment, controlling device 410 may also write a value into parameter registers 433 indicating the quantity of parameter storage locations in such a chain. However, in another embodiment, each parameter storage location may provide the base address of the next parameter storage location in a chain of parameter storage locations, thereby eliminating the need for each parameter storage location in a chain of parameter storage locations to be located at predetermined intervals within addressable space 440. In such an embodiment, the last parameter storage location in such a chain may provide a value in place of a base address that indicates that the last parameter storage location in the chain has been reached.

Figure 5:
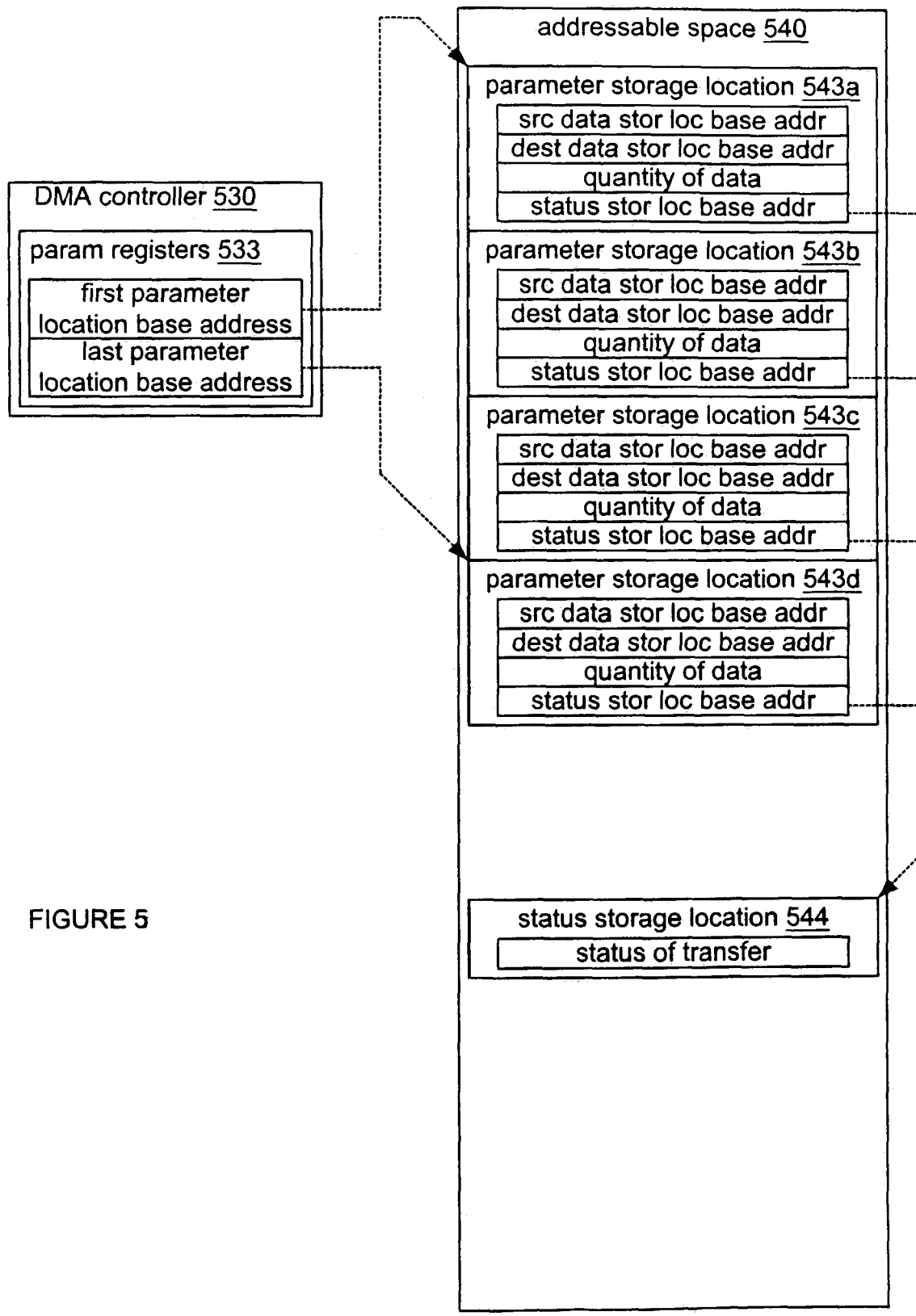
FIG. 5 is another block diagram of embodiments of interaction between devices engaged in transferring multiple blocks of data.

FIG. 5 is another block diagram of embodiments of interactions between devices engaging in transferring multiple blocks of data. Specifically, FIG. 5 depicts the interaction of a DMA controller and one or more memory devices and/or devices providing storage in carrying out the transfer of multiple blocks of data (blocks of data not actually shown for sake of clarity). The numbered items in FIG. 5 are meant to generally correspond to the number items in FIG. 4, and in a manner not unlike FIG. 4, addressable space 540 is a map of address locations accessible to both a controlling device (not shown) and DMA controller 530.

In a manner similar to FIG. 4, multiple parameter storage locations (543a through 543d) have been allocated within addressable space 540, and similarly to what was discussed at length with regard to FIG. 4, DMA controller 530 accesses each of parameter storage locations 543a through 543d to obtain base addresses for source data and destination data storage locations along with quantities of data to be transferred and corresponding base addresses for status storage locations in which to write values indicating the status of each transfer. However, unlike embodiments discussed with regard to FIG. 4, FIG. 5 depicts embodiments in which the same location, namely status storage location 544, is being pointed to from within parameter storage locations 543a through 543d as a single common location into which the status of each transfer is to be written by DMA controller 530. Such a use of a single status storage location would allow a controlling device to monitor the status of multiple transfers with repeated accesses to only one location with addressable space 540. In such an embodiment, the values written by DMA controller 530 into status storage location 544 may additionally incorporate some form of identification value that would allow a controlling device to distinguish which transfers have been completed and/or which transfer is currently underway.

FIG. 5 also depicts the use of parameter registers 533 to supply the base addresses of both the first and last parameter storage locations as a way to both trigger the start of one or more transfers of blocks of data and a count of how many transfers exist in a chain of transfers. As previously discussed, some embodiments may employ a predetermined interval of address space between base addresses at which each parameter storage location would be positioned within addressable space 540, and other embodiments may employ pointers within each parameter storage location providing the base address of the next parameter storage location in a chain of parameter storage locations for corresponding multiple transfers to be carried out.

Figure 6:
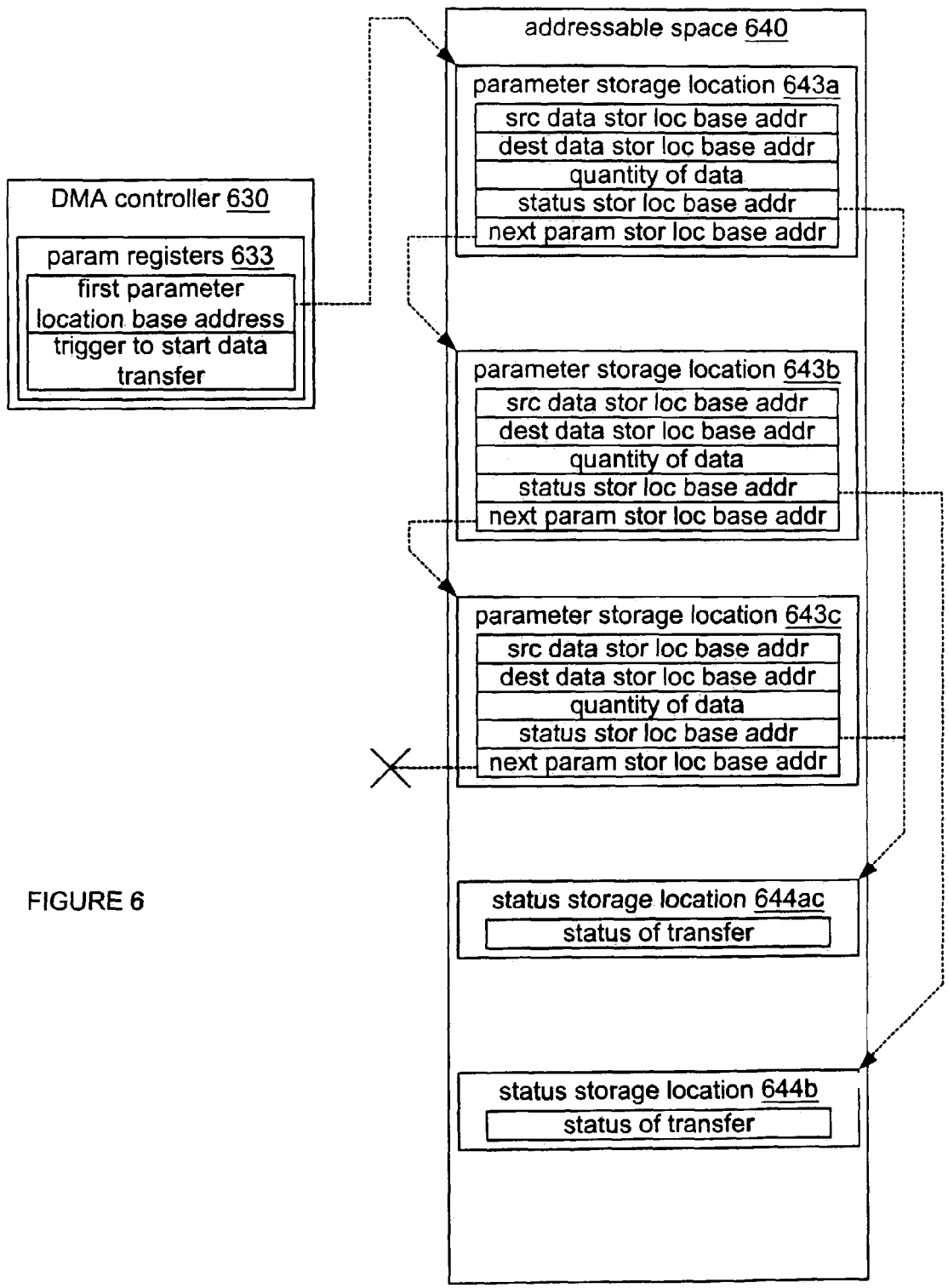
FIG. 6 is still another block diagram of embodiments of interaction between devices engaged in transferring multiple blocks of data.

FIG. 6 is still another block diagram of embodiments of interactions between devices engaging in transferring multiple blocks of data. Specifically, FIG. 6 depicts the interaction of a DMA controller and one or more memory devices and/or devices providing storage in carrying out the transfer of multiple blocks of data (blocks of data not actually shown for sake of clarity). The numbered items in FIG. 6 are meant to generally correspond to the number items in FIG. 5, and in a manner not unlike FIG. 5, addressable space 640 is a map of address locations accessible to both a controlling device (not shown) and DMA controller 630. In a manner similar to FIG. 5, multiple parameter storage locations (643a through 643c) have been allocated within addressable space 640, and similarly to what was discussed at length with regard to FIG. 5, DMA controller 630 accesses each of parameter storage locations 643a through 643c to obtain base addresses for source data and destination data storage locations along with quantities of data to be transferred and corresponding base addresses for status storage locations in which to write values indicating the status of each transfer. However, unlike embodiments discussed with regard FIG. 5, FIG. 6 depicts parameter storage locations 643a through 643c being allocated within addressable space 640 in a manner that is not at regular intervals, and with pointers for the next parameter storage location being provided within each parameter storage location. In carrying out each transfer, DMA controller 630 accesses the pointer to the next parameter storage location to obtain the base address of the next parameter storage location until accessing the pointer within parameter storage location 643c to obtain the base address of another parameter storage location provides a pointer indicating that there are no more parameter storage locations with parameters for a transfer of a block of data, at which point, DMA controller 630 ceases carrying out transfers of blocks of data.

FIG. 6 also illustrates the use of pointers to status storage locations to provide the status of data transfers corresponding to parameter storage locations 643a and 643c to a common status storage location (namely, status storage location 644ac), and to provide the status of the data transfer corresponding to parameter storage location 643b to a different status storage location (namely, status storage location 644b). Such a use of separate and common status storage locations may prove advantageous where multiple transfers are related to the carrying out of one function by a computer system of which DMA controller 630 is a part, while other transfers are related to the carrying out of a different function within the same computer system. More specifically, status storage locations 644ac and 644b may be allocated within different memory devices and/or devices with memory buffers. By way of example, status storage location 644ac may be allocated within a system memory such that a CPU would be able to efficiently monitor the status of the corresponding transfers, while status storage location 644b may be allocated within a memory buffer provided by another device such that the other device would be able to efficiently monitor the status of the corresponding transfer.

Figure 7:
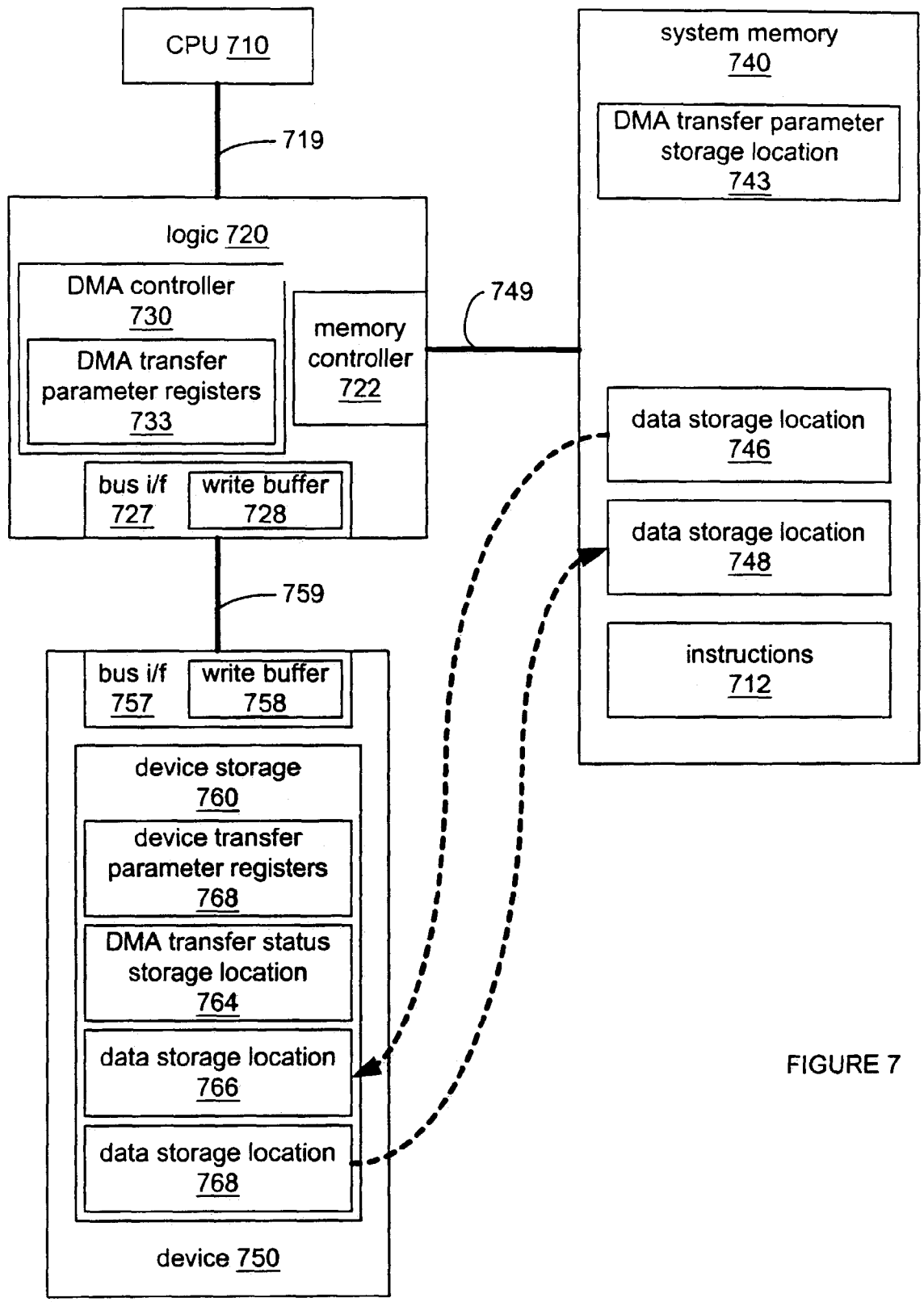
FIG. 7 is still another block diagram of other embodiments employing a computer system.

FIG. 7 is another block diagram of embodiments employing a computer system. The numbered items in FIG. 7 are meant to generally correspond to the number items in FIG. 2, and in a manner not unlike computer system 200 of FIG. 2, computer system 700 is, at least in part, made up of CPU 710, bus 719, logic 720, bus 749, system memory 740, bus 759 and device 750. As was the case with computer system 200, those skilled in the art will readily recognize that this is but one example of many possible forms of core of computer system 200, and that computer system 200 may also be further made up of other busses and devices not shown. Logic 720 is coupled to CPU 710 via bus 719, and performs various functions in support of CPU 710 including controlling and providing CPU 710 with access to system memory 740 to which logic 720 is further coupled via memory controller 722 within logic 720 and bus 749. Logic 720 also provides access to other devices making up computer system 700, such as device 750, to which logic 720 is coupled via bus interface 727 within logic 720 and bus 759, as well as bus interface 757 within device 750.

CPU 710 executes a series of instructions 712 stored within system memory 740 that causes CPU 710 to program DMA controller 730 to carry out a transfer of a block of data from data storage location 746 allocated within system memory 740 to data storage location 766 allocated within device storage 760 of device 750. CPU 710 writes various parameters of the transfer to take place into memory locations within DMA transfer parameter storage location 743 allocated within system memory 740. Such parameters could include, but are not limited to, the starting addresses of data storage locations 746 and 766, a value indicating the quantity of data to be transferred, and a value indicating that the status of the transfer is to be provided at DMA transfer status storage location 764 allocated within device storage 760. CPU 710 is also caused to write one or more of parameter registers 733 within DMA controller 730 with a value specifying the starting address of DMA transfer parameter storage location 743, and a value into one or more control bits as a trigger to cause the transfer to take place. DMA controller 730 then executes the transfer. During the execution of this transfer, CPU 710 and/or device 750 is able to read DMA transfer status storage location 764 one or more times to determine whether or not DMA controller 730 has written a value into DMA transfer status storage location 764 that indicates that the transfer has been completed.

CPU also 710 executes more of the series of instructions 712 that causes CPU 710 to program device 750 to carry out a transfer of a block of data from data storage location 768 allocated within device storage 760 within device 750 to data storage location 748 allocated within system memory 740. CPU 710 writes into device transfer parameter registers 768 various parameters of the transfer to take place. Such parameters could include, but are not limited to, the starting addresses of data storage locations 768 and 748, and a value indicating the quantity of data to be transferred. Device 750 then executes the transfer.

Using DMA controller 730 to transfer data from system memory 740 to device 750, and using bus mastering functions of device 750 to transfer data from device 750 to system memory 740, may provide greater efficiency in the moving of blocks of data than might be possible by using either DMA controller 730 or device 750, alone, to carry out both transfers. In this way, each transfer is carried out as one or more write operations across bus 759, taking advantage of write buffers 728 and 758 that corresponding bus interfaces 727 and 757 may provide. The use of write buffer 728 would allow the writing of data by DMA controller 730 to device storage 760 through bus 759 to be buffered or "posted" such that as a portion of data propagates from write buffer 728 through bus 759 towards device storage 760, DMA controller 730 is able to read another portion of data from system memory 740. Correspondingly, the use of write buffer 758 by the bus mastering functions of device 750 would allow the writing of data by device 750 to system memory 740 through bus 759 to also be "posted" such that as a portion of data propagates from write buffer 758 through bus 759 toward system memory 740, device 750 is able to read another portion of data from device storage 760.

In some embodiments, this use of a combination of DMA controller 730 and bus mastering functions of device 750 may be brought about by way of CPU 710 executing a series of instructions provided by a device driver corresponding to device 750. Such a device driver may interact with an operating system also being executed by CPU 710 in the course of the normal operation of computer 700 to increase the efficiency of transfers of data between device storage 760 within device 750 and system memory 740 by avoiding the use of the bus mastering functions of device 750 to read data from system memory 740 and avoiding the use of DMA controller 730 to read data from device storage 760.

Figure 8:
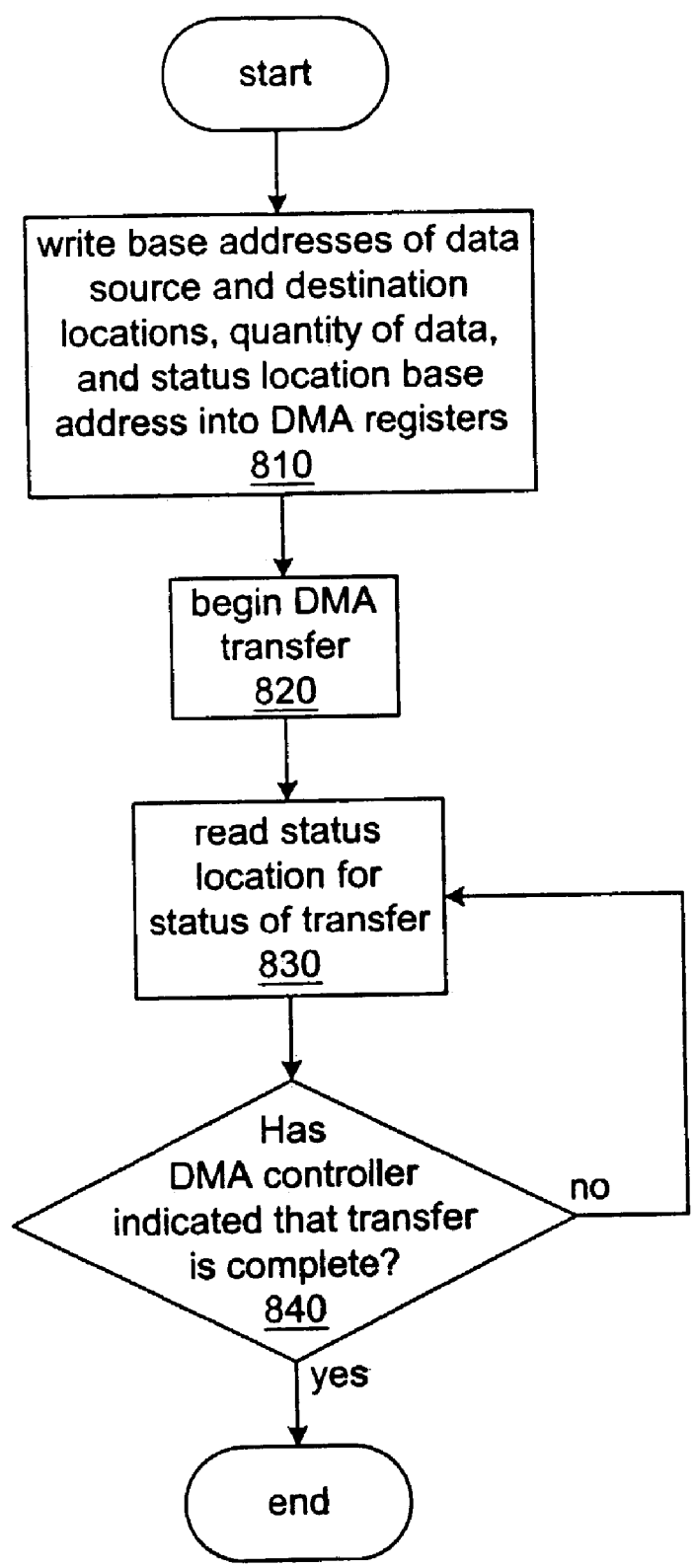
FIG. 8 is a flow chart of an embodiment.

FIG. 8 is a flow chart of an embodiment. At 810, the base addresses of the source and destination locations of the data to be transferred, the quantity of data to be transferred, and the base address of the status location to which status of the transfer is to be written are all provided to a DMA controller via DMA registers or other mechanism. The DMA controller is signaled to begin execution of the DMA transfer and does so at 820. At 830, as the transfer is executed, a CPU or other device reads the status of the transfer from the status location into which the DMA controller is to write the status. At 840, if the DMA controller has not yet written a value into the status location into which status is to be written that indicates that the transfer has been completed, then another read of the status occurs at 830. Otherwise, the end is reached if the DMA controller has written a value into the status location into which status is to be written that indicates that the transfer has been completed.

Figure 9:
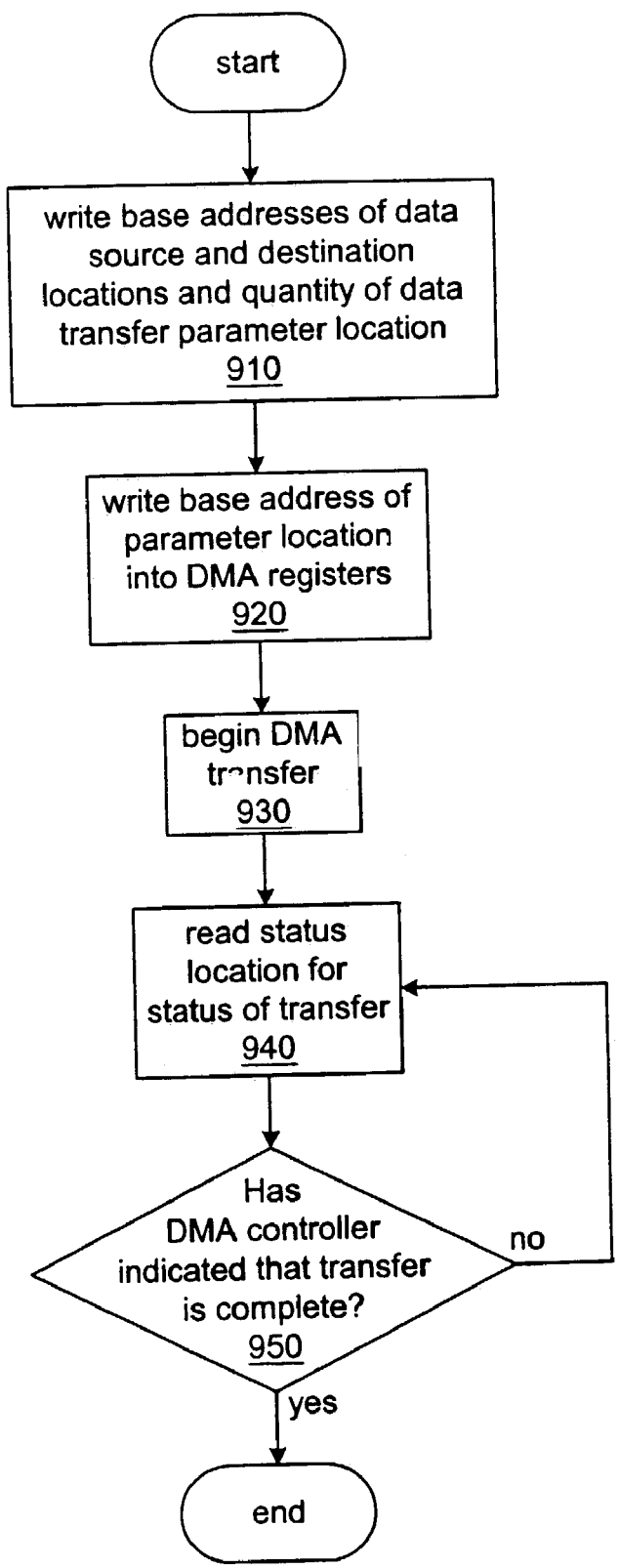
FIG. 9 is a flow chart of another embodiment.

FIG. 9 is a flow chart of another embodiment of a transfer of a block of data. At 910, transfer parameters including, but not limited to, the base addresses of the data source and destination locations of the data to be transferred, the quantity of the data to be transferred, and the base address of the status location into which status of the transfer is to be written are all written into a parameter location within a system memory or other memory device or device with an addressable memory such as a buffer. At 920, the base address of the parameter location into which the parameters of the transfer were written at 910 is provided to a DMA controller via DMA registers or other mechanism. The DMA controller is signaled to begin execution of the transfer and does so at 930. At 940, as the transfer is executed, a CPU or other device reads the status of the DMA transfer from an addressable status location into which the DMA controller is to write the status. At 950, if the DMA controller has not yet written a value into status location into which status is to be written that indicates that the DMA transfer is completed, then another read of the status occurs at 940. Otherwise, the end is reached if the DMA controller has written a value into the status location into which status is to be written that indicates that the transfer has been completed.

Figure 10:
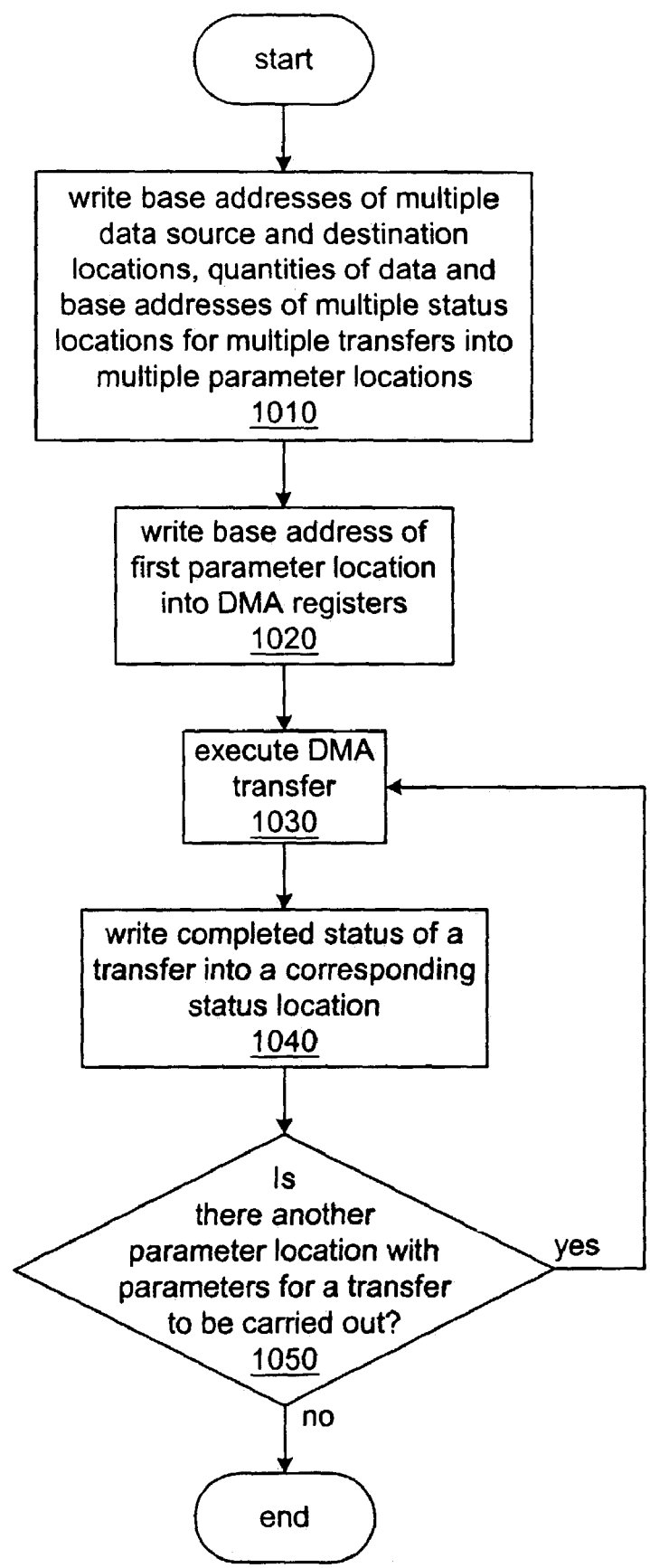
FIG. 10 is a flow chart of still another embodiment.

FIG. 10 is a flow chart of an embodiment. At 1010, sets of parameters such as base addresses of data source and destination locations, quantities of data, and base addresses of status locations are written to multiple parameter locations for multiple transfers, with each one of the multiple transfer locations corresponding to one each of the multiple transfers to be carried out. At 1020, the base address of the first of the multiple parameter locations into which transfer parameters were written is provided to a DMA controller via DMA registers or other mechanism. The DMA controller is signaled to begin execution of a DMA transfer and does so at 1030, and when that DMA transfer executed at 1030 is completed, status indicating completion of that DMA transfer is written into the status location corresponding to that transfer at 1040. If, at 750, there is an indication of an another parameter location with parameters for another transfer yet to be carried out, then that transfer is executed at 1030. Otherwise, the end is reached if there are no more parameter locations corresponding to transfers yet to be carried out.

In each of the aforedescribed embodiments in which multiple transfer parameter locations are allocated in support of carrying out multiple transfers, there may be variations of those embodiments in which the transfer parameter locations may be used in a circular or "FIFO-like" manner in which parameter locations are used as a loop so as to be repeatedly reused for new transfers. Where transfer parameter locations employ pointers to direct a DMA controller to the base address where a next transfer parameter location may be found, such pointers may be used such that the pointer of what might otherwise have been the "last" transfer parameter location will point to what otherwise might have been the "first" transfer parameter location. Where transfer parameter locations do not employ pointers, but rely on being positioned within the addressable space of a memory device (or other device providing storage locations) at predetermined intervals, a DMA controller may be provided with an indication of which transfer parameter location is the last one in the chain of transfer parameter locations such that the DMA controller will be able to "loop back" to the first one.

The invention has been described in conjunction with the preferred embodiment. It is evident that numerous alternatives, modifications, variations and uses will be apparent to those skilled in the art in light of the foregoing description. It will also be understood by those skilled in the art that the present invention may be practiced in support of electronic devices other than computer systems such as audio/video entertainment devices, controller devices in vehicles, appliances controlled by electronic circuitry, etc.

What is claimed is:

1. An apparatus comprising:
    a first memory device in which a source data location is allocated having a block of data to be transferred;
    a second memory device in which a destination data location is allocated for the block of data to be transferred to;
    a controlling device coupled to both the first and second memory devices and capable of executing machine-readable instructions;
    a DMA controller coupled to the controlling device and both the first and second devices, and having at least one transfer status location base address register into which the controlling device writes a value specifying for each transfer a base address of a status location at which the DMA controller writes a value indicating a status of the transfer of the block of data from source data location to the destination data location.

2. The apparatus of claim 1, wherein the DMA controller has parameter registers into which the controlling device writes at least the base address of the source data location, the base address of the destination data location, and the quantity of data making up the block of data to be transferred.

3. The apparatus of claim 1, wherein the DMA controller has at least one transfer parameters location base address register into which the controlling device writes a value specifying the base address of a parameters location from which the DMA controller obtains parameters of the transfer of the block of data.

4. The apparatus of claim 3, wherein the parameters location from which the DMA controller obtains the parameters of the transfer stores at least the base address of the source data location, the base address of the destination data location, and the quantity of data making up the block of data to be transferred.

5. The apparatus of claim 1, further comprising:
a first standardized bus coupled between the DMA controller and the first memory device; and
a second standardized bus coupled between the DMA controller and the second memory device.

6. The apparatus of claim 1, wherein the DMA controller forms a bridge between the first memory device and the second memory device.

7. The apparatus of claim 1, wherein the first memory device is the same device as the second memory device.

8. The apparatus of claim 1, wherein the first memory device and the second memory device are in a same addressable space of the controlling device.

9. The apparatus of claim 1, wherein the controlling device writes a value specifying for each transaction a base address of a status location during execution of machine-readable instructions.

10. An apparatus comprising:
a first memory device in which a source data location is allocated having a block of data to be transferred from in a first transfer;
a second memory device in which a destination data location is allocated for the block of data to be transferred to in a first transfer;
a controlling device coupled to both the first and second memory devices and capable of executing machine-readable instructions;
a DMA controller coupled to the controlling device and both the first and second devices, and having a transfer parameters location base address register into which the controlling device writes a value specifying the base address of a first parameters location from which the DMA controller obtains parameters of the first transfer at transfer time.

11. The apparatus of claim 10, wherein the first parameters location from which the DMA controller obtains the parameters of the first transfer stores at least the base address of the source data location, the base address of the destination data location, and the quantity of data making up the block of data to be transferred in the first transfer.

12. The apparatus of claim 11, wherein the first parameters location from which the DMA controller obtains the parameters of the first transfer further stores the base address of a first transfer status location into which the controlling device writes a value indicating a status of the first transfer.

13. The apparatus of claim 11, wherein the first parameters location from which the DMA controller obtains the parameters of the first transfer further stores the base address of a second parameters location from which the DMA controller obtains the parameters of a second transfer.

14. The apparatus of claim 13, wherein the second parameters location from which the DMA controller obtains the parameters of the second transfer further stores the base address of a second transfer status location into which the controlling device writes a value indicating a status of the second transfer.

15. A method comprising:
writing a first set of parameters for a transfer of a first block of data to be carried out by a DMA controller to a first transfer parameters location allocated within a memory device, where in the parameters for the transfer of the first block of data are comprised of a base address of a first transfer status location;
writing the base address of the first transfer parameters location into a register of the DMA controller at transfer time;
triggering the DMA controller to start to carry out the transfer of the first block of data by accessing the first transfer parameters location to obtain parameters of the transfer of the block of data to be carried out; and
accessing the first transfer status location to determine whether or not the DMA controller has written a value into the first transfer status location indicating that the transfer of the first block of data has been completed.

16. The method of claim 15, wherein the triggering of the DMA controller to start to carry out the transfer of the first block of data further comprises:
obtaining from the first transfer parameters location the base address of a first data source location from which the first block of data is read during the transfer of the first block of data, wherein the first data source location is allocated within a first memory device;
obtaining from the first transfer parameters location the base address of a first data destination location to which the first block of data is written during the transfer of the first block of data, wherein the first data destination location is allocated within a second memory device; and
obtaining from the first transfer parameters location a value specifying the quantity of data of which the first block of data to be transferred is comprised.

17. The method of claim 15, further comprising accessing the first transfer parameters location to obtain the base address of a second transfer parameters location having a second set of parameters for the transfer of a second block of data.

18. The method of claim 15, wherein accessing the first transfer status includes a processor reading the first transfer status;
and further comprising a DMA controller writing a value into the first transfer status.

19. A machine-accessible medium comprising code that when executed by a processor within an electronic device, causes the electronic device to:
write a first set of parameters for a transfer of a first block of data to be carried out by a DMA controller to a first transfer parameters location allocated within a memory device, where in the parameters for the transfer of the first block of data are comprised of a base address of a first transfer status location;

write the base address of the first transfer parameters location into a register of the DMA controller at transfer time;

trigger the DMA controller to start to carry out the transfer of the first block of data by accessing the first transfer parameters location to obtain parameters of the transfer of the block of data to be carried out; and access the first transfer status location to determine whether or not the DMA controller has written a value into the first transfer status location indicating that the transfer of the first block of data has been completed.

20. The machine-accessible medium of claim 19, wherein the electronic device is further caused to:

obtain from the first transfer parameters location the base address of a first data source location from which the first block of data is read during the transfer of the first block of data, wherein the first data source location is allocated within a first memory device;

obtain from the first transfer parameters location the base address of a first data destination location to which the first block of data is written during the transfer of the first block of data, wherein the first data destination location is allocated within a second memory device; and obtain from the first transfer parameters location a value specifying the quantity of data of which the first block of data to be transferred is comprised.

21. The method of claim 19, further comprising accessing the first transfer parameters location to obtain the base address of a second transfer parameters location having a second set of parameters for the transfer of a second block of data.

* * * * *